A. HAMILTON.
FLEXIBLE MOLDING.
APPLICATION FILED AUG. 31, 1916.
1,221,444.  Patented Apr. 3, 1917.
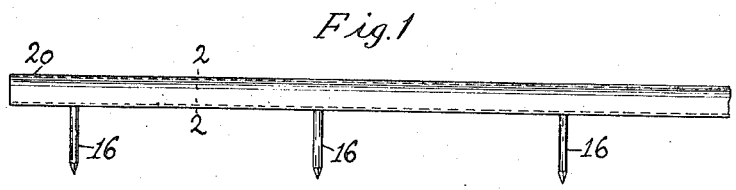
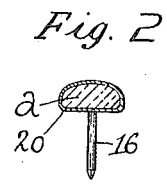
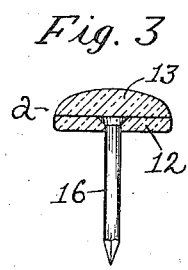
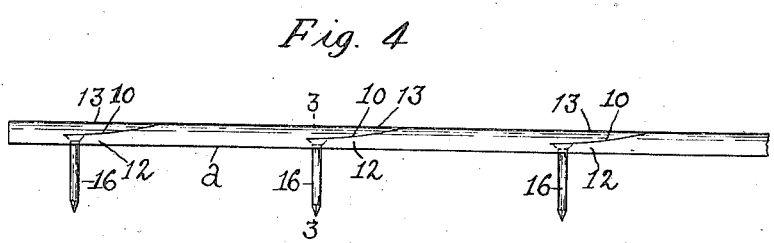
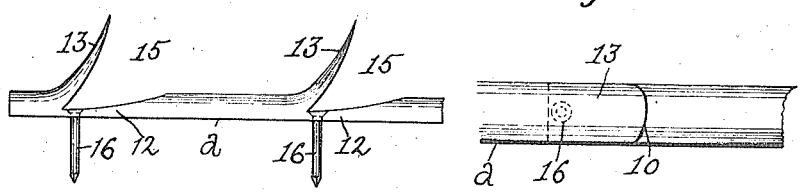
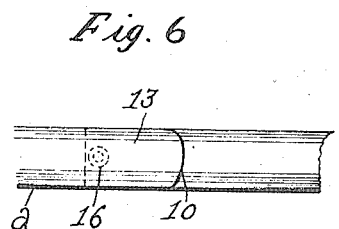
Inventor
Ashton Hamilton
By Jas. H. Churchill
Atty.

UNITED STATES PATENT OFFICE.

ASHTON HAMILTON, OF BROCKTON, MASSACHUSETTS.

FLEXIBLE MOLDING.

1,221,444. Specification of Letters Patent. Patented Apr. 3, 1917.

Application filed August 31, 1916. Serial No. 117,940.

*To all whom it may concern:*

Be it known that I, ASHTON HAMILTON, of Brockton, county of Plymouth, and State of Massachusetts, have invented an Improvement in Flexible Molding, of which the following description, in connection with the accompanying drawings, is a specification, like characters on the drawings representing like parts.

This invention relates to a flexible molding of leather, fiber board or other flexible material, which is capable of general use, but which is especially adapted for use as a finish or trimming on the bodies of automobiles and like vehicles, furniture, etc.

The invention has for its object to provide a simple, inexpensive and efficient molding for the purpose specified. To this end, the molding is made of a strip of leather, fiber board or other flexible material of substantial thickness to enable it to be cut to form flaps or members, which are employed to cover the heads of nails, brads, tacks or other fastening devices employed to secure the molding strip to the automobile body or other object.

The covering flaps or members are formed in the molding strip at the points or places where the nails are to be located, and they may and preferably will be cemented or otherwise secured in fixed relation to the strip to permanently retain the fastening devices attached to the strip ready for use.

The leather or other flexible strip may be colored in any suitable manner to impart to it the finish or color desired, or it may be left in its original color and enveloped by a jacket or covering of a superior leather or of other material which is provided with the color or finish desired, said jacket or covering being cemented or otherwise attached to the nail carrying strip.

The particular features of the invention will be pointed out in the claims at the end of this specification.

Figure 1 represents in side elevation a sufficient portion of a flexible molding embodying this invention to enable it to be understood.

Fig. 2, a cross section on the line 2—2, Fig. 1.

Fig. 3, a cross section of the nail carrying strip on an enlarged scale, the section being taken on the line 3—3, Fig. 4.

Fig. 4, a side elevation of the nail carrying strip without the jacket or cover.

Fig. 5, a side elevation of the nail carrying strip with the flaps turned up, and Fig. 6, a plan view of a portion of the strip shown in Fig. 4.

Referring to the drawing *a* represents a strip of leather such as sole leather, or it may be any other flexible material such for instance as a fiber board or the like, which strip is of sufficient thickness to permit it to have extended into it from its upper surface cuts 10, each of which is made of substantial length and extends at its inner end substantially parallel with the bottom surface of the strip so as to leave uncut portion 12 with a substantially flat upper surface.

The cuts 10 form flaps or covering members 13 which preferably remain attached to the strip *a* at their rear ends, and which are capable of being turned up at an angle to the strip *a* so as to form a substantially wide open mouth or space 15, see Fig. 5, into which a nail, brad or other fastening device 16 can be entered, and have its pointed end readily forced through the substantially thin uncut portion 12 of the strip at or near the inner end of the cut. After the nails 16 or other fastening devices have been inserted through the uncut portions 12 of the strip *a*, the flaps 13 are turned down into their original position and may and preferably will be cemented or otherwise fastened to the uncut portion of the strip *a* so as to restore the latter to substantially its original form or shape and at the same time conceal the head of the nail 16 within the strip and also serve as retaining devices to prevent the nail being accidentally disengaged from the strip. The cuts 10 are preferably made of substantial inclination so as to form flaps which taper from a substantially thin free end to a substantially thick rear end or butt, which latter comes directly over the head of the nail and offers a substantial thickness of material to prevent the head of the nail being forced through the flap when the nail is driven into the object to which the flexible molding is attached. The flexible molding thus produced and shown in Fig.

4, may be colored or otherwise finished and used as a molding, or the said strip may be inclosed in a jacket or cover 20 of thin leather or other material which may have a highly finished outer surface, as for instance the jacket or cover may be made of a piece of thin, flexible leather which has a highly finished and neat appearing outer surface. The jacket or cover 20 may and preferably will be folded over and under the nail carrying strip *a* as represented in Fig. 2, and may be cemented or otherwise fastened to said strip.

While it may be preferred to use the jacket or cover 20, as represented in Figs. 1 and 2, it is not desired to limit the invention in this respect, as the nail carrying strip *a* shown in Fig. 4 may be used alone.

A flexible molding such as above described, is capable of general use, but is especially adapted to be used in trimming the bodies of vehicles such as automobiles.

The flexible nail carrying strip *a* may be produced at a minimum expense, as the nail concealing and retaining flaps 13 are formed from the strip itself by merely cutting the latter which is done without waste.

Claims:

1. A flexible molding comprising a strip of flexible material provided with cuts extended from one surface toward the opposite surface to form flaps which are spaced apart, and fastening devices having their lower ends extended through the uncut portions of the strip beneath said flaps, and means for securing said flaps in their original position on the strip to cover the heads of said fastening devices.

2. A flexible molding comprising a strip of flexible material provided with cuts extended from one surface toward the opposite surface to form flaps which are spaced apart, and fastening devices having their lower ends extended through the uncut portions of the strip beneath said flaps.

In testimony whereof, I have signed my name to this specification.

ASHTON HAMILTON.